United States Patent [19]

Aceto

[11] Patent Number: 4,535,508

[45] Date of Patent: Aug. 20, 1985

[54] EXPANDABLE CASING SIZING MECHANISM AND METHOD

[75] Inventor: Roger Aceto, Brookfield Center, Conn.

[73] Assignee: Union Carbide Corporation, Danbury, Conn.

[21] Appl. No.: 595,364

[22] Filed: Mar. 30, 1984

[51] Int. Cl.³ .............................................. A22C 11/02
[52] U.S. Cl. .......................................... 17/49; 17/41; 53/459; 53/576
[58] Field of Search .................. 17/1 R, 33, 38, 41, 17/42, 49; 53/459, 567, 576

[56] References Cited

U.S. PATENT DOCUMENTS

| | | | |
|---|---|---|---|
| 3,553,769 | 1/1971 | Myles et al. | 17/49 |
| 4,007,761 | 2/1977 | Beckman | 138/103 |
| 4,202,075 | 5/1980 | Michel et al. | 17/41 |
| 4,335,488 | 6/1982 | Becker | 17/33 |
| 4,442,568 | 4/1984 | Petry | 53/576 X |

*Primary Examiner*—Fred A. Silverberg
*Attorney, Agent, or Firm*—Roger Aceto

[57] ABSTRACT

An expandable casing sizing mechanism and casing sizing method wherein the movement of a sizing member onto a stuffing horn automatically moves an expansion member radially outward to a casing stretching size.

13 Claims, 4 Drawing Figures

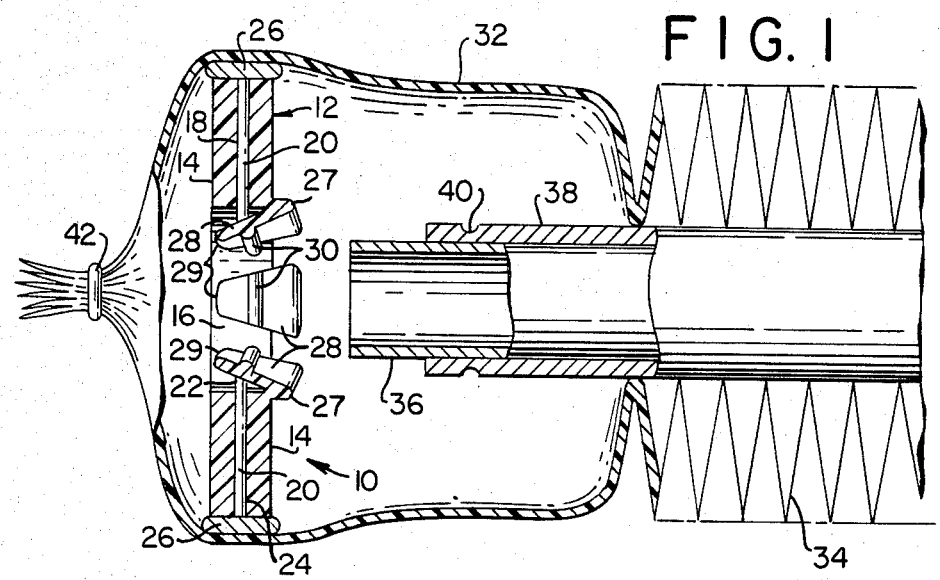
FIG. 1
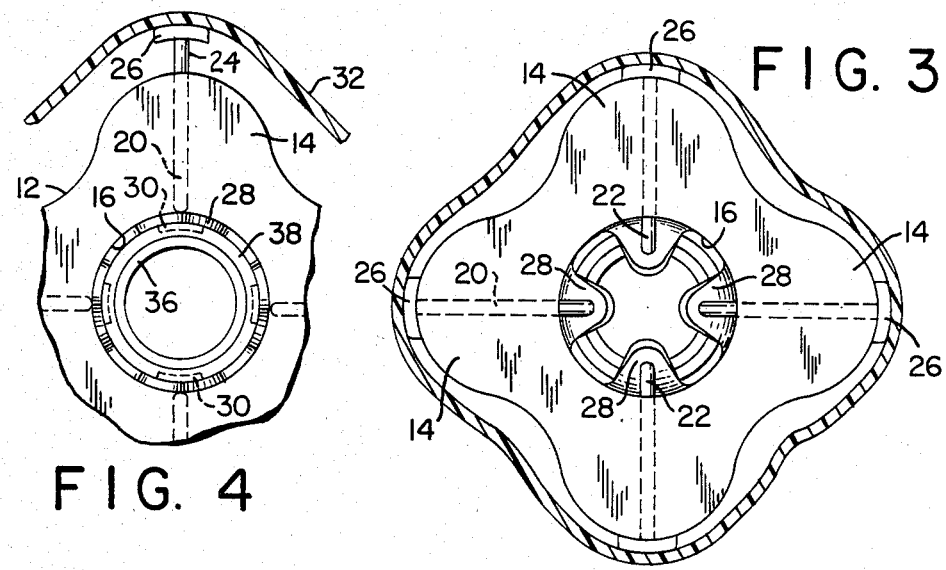
FIG. 3
FIG. 4
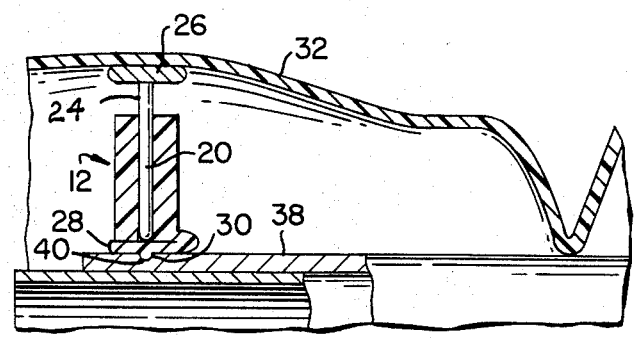
FIG. 2

EXPANDABLE CASING SIZING MECHANISM AND METHOD

BACKGROUND OF THE INVENTION

The present invention relates to a sizing means and method for sizing a flexible tubular food casing during the stuffing thereof. In particular, the present invention relates to an expandable sizing means together with a method for using the sizing means.

Automatic and semiautomatic systems for stuffing food casings with a variety of food products as well known in the meat packing industry.

For production of encased products on a fully automatic basis, shirred casing is used. Shirred casing is a relatively long continuous length of casing of up to 200 feet or more which is shirred to a much shorter length. Other stuffing operations may use shorter, cut lengths of casing which are not shirred.

It is also common to use a casing sizing means in connection with the stuffing of relatively large casings which, for example, may range between 50 and 200 millimeters in diameter. These casings have a relatively thick wall, often reinforced with a fibrous web. The stuffing of these larger casings is often facilitated by diametrically stretching the casing just prior to stuffing.

This diametrical stretching can be accomplished by longitudinally passing the casing over stationary sizing means and allowing the sizing means to stretch the casing to a predetermined diameter. The friction between the longitudinally moving casing and stationary sizing means also creates an amount of drag or hold-back force on the casing. While this drag or hold-back force, in part, contributes to the final diameter of the stuffed casing product, it also determines the extent to which the casing is filled. In general, the greater the hold-back force or drag on the casing, the more fully and tightly packed the casing will be with food product.

While diametrical sizing and holdback is desired to provide a uniform, fully stuffed encased product, there are times during the stuffing operation when the casing should be relatively free of the drag or hold-back force created by the sizing means. For example, during automatic stuffing operations using the larger sizes of casing, it is periodically necessary to provide an amount of casing slack, as when the stuffing apparatus is operated to gather and close the casing around the ends of the stuffed product. Reducing the drag or hold-back force on the casing in order to produce an amount of casing slack facilitates the gathering and closing operation.

Sizing means as used in the stuffing of larger sizes of casing having either a fixed diameter as shown, for example, in U.S. Pat. Nos. 4,007,761 and 4,335,488, or an adjustable diameter as shown in U.S. Pat. Nos. 3,457,588 and 4,202,075. The latter type, in turn, can comprise elements which are integral components of the stuffing apparatus (U.S. Pat. No. 3,457,588) or they can be attachable to the stuffing apparatus (U.S. Pat. No. 4,202,075).

The present invention is an expandable sizing means of the type which is readily attachable to the stuffing apparatus. Moreover, the sizing means of the present invention can be expanded to a fixed casing stretching size by the act of attaching the sizing means to the stuffing apparatus. This facilitates use of the sizing means in that it can be easily implanted into a casing in a collapsed or unexpanded state and then expanded to a casing stretching size when the casing and sizing means are mounted to the stuffing apparatus.

Thus, the sizing means of the present invention lends itself to sale either as a component of a casing article (casing plus sizing means) or as a separate item. For example when sold as a component of a casing article, preferably together with a shirred casing length, the sizing means is simply implanted into an unshirred portion of the casing and the casing is closed over the sizing means. In its collapsed state, the diameter of the sizing means is preferably smaller than the diameter of the unshirred, unstretched casing, so that the sizing means can be easily inserted into the unshirred casing portion.

In use, the sizing means is automatically expanded to a fixed casing stretching size as the casing article is mounted to the stuffing apparatus. Thereafter, casing slack, if needed, can be provided by operation of a conventional slacker mechanism as shown for example, in U.S. Pat. No. 4,044,426 or by other means known in the art.

The sizing means can be used either with shirred or cut lengths of casing. When used with shirring casing, the sizing means, in a collapsed or unexpanded condition, is inserted into the casing by the user and then is mounted to the stuffing apparatus. In the alternative, the casing is loaded onto the stuffing machine, then the sizing means is put into position, and then the casing is pulled over the sizing means.

SUMMARY OF THE INVENTION

The present invention can be characterized in one aspect thereof by a diametrically expandable sizing means including:

(a) a sizing disc capable of fitting within an unshirred portion of casing, the disc having an opening to accommodate passage of a stuffing horn assembly, (b) a radially movable rod carried by the disc, the rod having an inner end extending into the opening and an outer end substantially flush with the outer periphery of the disc, and (c) lifter means on the disc which engage against the lower end of the rod upon passage of the stuffing horn assembly through the opening for moving the rod radially outward to lift a casing contacting member to a casing stretching position.

In its method aspect, the present invention comprises a method for diametrically stretching casing, characterized by the steps of:

(a) locating an expandable casing sizing mean within an unshirred, substantially unstretched portion of casing, the sizing means having an opening to accommodate passage of a stuffing horn assembly, a radially movable casing contacting member for contacting against the inside surface of the casing, and lifter means extending into the opening for moving the member to a casing contacting and stretching position;

(b) pushing the sizing means over the stuffing horn assembly to extend the stuffing horn assembly through the opening;

(c) contacting the lifter means against the surface of the stuffing horn assembly so as to spread the lifter means outwardly as the stuffing horn assembly passes through the opening; and (d) moving the casing contacting member to a casing contacting and stretching position responsive to the spreading of the lifter means.

DESCRIPTION OF THE DRAWINGS

FIG. 1 is a side elevation view, in section, showing the expandable sizing means of the present invention in an unexpanded condition and just prior to mounting;

FIG. 2 is a view similar to FIG. 1, only showing a portion of the sizing means as it would appear in an expanded condition and mounted in place on a stuffing horn assembly;

FIG. 3 is a front view of the sizing means shown in FIG. 1; and

FIG. 4 is a front view of the sizing means shown in FIG. 2.

DESCRIPTION OF THE PREFERRED EMBODIMENT

Referring to the drawing, FIG. 1 shows that the sizing means, generally indicated at 10, includes a sizing disc 12. This disc can be formed as a rigid circular disc or as a disc having a plurality of radial arms 14 as shown in the Figures. The sizing disc has a central opening 16 to accommodate the passage of a stuffing horn.

Extending radially through the sizing disc 12 are guide passages 18. Slidably positioned in each guide passage is a rod 20. Rods 20 are longer than the guide passages so that when the sizing means 10 is in the unexpanded condition shown in FIGS. 1 and 3, the inner end 22 of each rod extends into central opening 16 while the outer end 24 of each rod extends to the outer peripherial surface of the sizing disc.

Fixed to the outer end 24 of each rod 20 is a casing contacting member 26. As shown in FIGS. 1 and 3 these members are substantially flush against the outer surface of the sizing disc when the sizing means 10 is in its unexpanded condition.

The sizing means 10 also includes a plurality of hinged lifters 28, wherein there is one lifter 28 associated with each rod 20. Each lifter 28 is a flap of material hinged at one end 27 to the sizing disc 12 adjacent to the central opening 16. The other end 29 of each lifter extends into the opening so the lifters are positioned beneath the inner end 22 of an associated rod 20. One or more of the lifters are provided with a tab 30 for locking the sizing means 10 into position on a stuffing horn as described hereinbelow.

FIG. 1 shows the sizing means 10 in an unexpanded condition and located within an unshirred portion 32 of a shirred casing length 34. In its unexpanded condition, the effective diametrical size of the sizing means is not large enough to stretch the unshirred portion of casing to a desired size.

In FIG. 1, the stuffing horn is shown at 36 and a slacker sleeve 38 is shown disposed about the stuffing horn. Sleeve 38 is attached to a slacker mechanism (not shown) of the stuffing machine and is reciprocally movable along the stuffing horn by the slacker mechanism. A sleeve of this type is known in the art and forms no part of the present invention. The sleeve has an annular groove 40 to receive the tabs 30 in a locking relationship for mounting the sizing means 10 to the sleeve.

Mounting the sizing means 10 to the sleeve is accomplished by positioning the sizing means to axially align opening 16 with the stuffing horn. The sizing means is then pushed over the stuffing horn and onto sleeve 38. As the sizing means is pushed over the stuffing horn 36 and on to the outer surface of sleeve 38, lifters 28 are engaged by the outer surface of the stuffing horn and the sleeve. The lifters are thereby spread outwardly and are pressed against the periphery of opening 16.

Rods 20 are moved radially outward responsive to the spreading lifters, and this, in turn, lifts the casing engaging members 26 from the outer periphery of the sizing disc 12 to an extended position as shown in FIGS. 2 and 4. Lifting the casing engaging members 26 in this fashion moves them against the inner surface of the unshirred casing 32, and diametrically stretches the casing to the desired size. Moreover, with lifters 28 positioned against the outer surface of sleeve 38, and pressed against the periphery of opening 16, both the rods 20 and the casing contacting members 26 are fixed in an expanded position. Thus the act of pushing the sizing means onto the stuffing horn and onto the sleeve, operates both to expand the sizing means and to fix the sizing means in an expanded position.

Pushing sizing disc 12 over sleeve 38 will eventually cause tabs 30 to seat into groove 40, thereby locking the expanded sizing means 10 to the sleeve adjacent to the discharge of the stuffing horn. Now, any reciprocal movement of the sleeve along the stuffing horn will provide slack casing for gathering and closing the casing over the ends of the stuffed product in accordance with the methods already known in the art.

After the shirred casing supply is exhausted, the sizing means 10 is forced off of the stuffing horn so that a new supply of casing can be put into position. To facilitate removal of the sizing means, the tabs 30 or lifters 28 can be frangible so that the sizing disc 12 breaks free when pushed off of the stuffing horn.

While the sizing means is shown as being attached to the sleeve 38, it would be obvious to attach the sizing means directly to the stuffing horn in situations not requiring the action of a slacker sleeve. Accordingly, for purposes of the present invention, the stuffing horn and sleeve, or the stuffing horn alone, can be considered a stuffing horn assembly to which the sizing means 10 is attached for use.

The sizing means 10 can be implanted into a shirred casing article wherein the casing is closed over the sizing means by a conventional clip closure 42 as shown in FIG. 1. With this arrangement, the entire casing article including the implanted expandable sizing means 10 is mounted as a unit to the stuffing machine. In the alternative, the casing is left open and the expandable sizing means 10 is a separate piece which is inserted through the open casing end and mounted to the stuffing machine after the casing supply is put on the machine.

Having described the invention in detail, what is claimed as new is:

1. An expandable sizing means for diametrically expanding a food casing about a stuffing horn assembly adjacent the discharge thereof prior to stuffing the casing, said sizing means comprising:
   (a) a sizing member capable of fitting within an unshirred substantially unstretched portion of casing, said member having an opening therethrough to accommodate passage of the stuffing horn assembly;
   (b) a radially movable rod carried by said sizing member, said rod having an inner end extending into said opening and an outer end substantially flush with the outer periphery of said sizing member;
   (c) a casing contacting member on the outer end of said rod; and (d) lifter means on said sizing member which engages against the inner end of said rod upon passage of the stuffing horn assembly through said opening to thereby move said rod radially outward and lift said casing contacting member to a casing stretching position.

2. An expandable sizing means as in claim 1 wherein said sizing member has a radially extending guide passage, said guide passage communicating at one end with said opening and at another end with the outer periphery of said sizing member, and wherein said rod is slidably carried within said guide passage.

3. An expandable sizing means as in claim 1 wherein said lifter means comprises a flap which is hinged at one end of said sizing member adjacent said opening and which extends into said opening.

4. An expandable sizing means as in claim 3 wherein said flap extends into said opening and beneath the inner end of said rod so that insertion of a stuffing horn assembly into said opening will move said flap toward that surface of said sizing member which defines the periphery of said opening.

5. An expandable sixing means as in claim 4 wherein said flap is adapted to move to a position against said surface responsive to said insertion.

6. An expandable sizing means as in claim 1 wherein said sizing member has a plurality of guide passages extending radially from said opening to the outer periphery of said sizing member, and said sizing member includes a plurality of said rods, one of said rods being slidably disposed in each of said guide passages.

7. An expandable sizing means as in claim 6, including a plurality of said lifter means, one of said lifter means being associated with each of said rods.

8. An expandable sizing means as in claim 1, including a lock element on said lifter means which cooperates with a corresponding lock element on said stuffing horn assembly for fixing said sizing means in a position adjacent the discharge end of the stuffing horn assembly.

9. A method for diametrically stretching a food casing comprising the steps of:

(a) locating an expandable casing sizing means within an unshirred, substantially unstretched portion of the casing, said sizing means having an axial opening defined by an inner axial peripheral surface to accommodate passage of a stuffing horn assembly, and having a radially movable casing contacting member for contacting against the inside surface of the casing and lifter means extending into the opening for moving said casing contacting member to a casing contacting and stretching position;

(b) pushing said sizing means over the discharge end of said stuffing horn assembly to extend said discharge end through said opening;
(c) contacting said lifter means against said stuffing horn assembly as said assembly passes through said opening;
(d) moving a said lifter means outwardly towards the inner axial peripheral surface of said sizing means by said assembly contacting said lifter means as said stuffing horn assembly passes through said opening; and
(e) moving said casing contacting member outwardly to said casing contacting and stretching position responsive to the moving of said lifter means against said peripherial surface.

10. A method as in claim 9, including the step of locking said casing contacting member in said casing contacting and stretching position by the action of said stuffing horn assembly which presses said lifter means towards the peripherial surface of said opening.

11. A method as in claim 9 wherein the outward moving of step (d) presses said lifter means against said peripherial surface.

12. A method as in claim 9 wherein said lifter means are hinged to said sizing means.

13. An expandable sizing means for diametrically expanding a food casing about a stuffing horn assembly adjacent the discharge thereof prior to stuffing the casing, said sizing means comprising:

a. a sizing member capable of fitting within an unshirred substantially unstretched portion of casing, said member having an axial opening therethrough to accommodate passage of the stuffing horn assembly, said sizing member has a tubular guide passage extending radially therethrough, said guide passage communicating at one end with said axial opening and at another end with the outer periphery of said sizing member;
b. radially movable casing contacting means on the outer periphery of said sizing member;
c. lifter means connected to said sizing member adjacent an axial surface which defines said axial opening, said lifter means having an end which initially extends into said opening to engage the stuffing horn assembly and which moves towards said axial surface upon passage of said stuffing horn assembly through said opening; and means slidably carried within said tubular guide passage and operatively connected to said lifter means and said contacting means for moving said casing contacting means outwardly from said outer periphery to a casing stretching position responsive to said lifter means moving towards an axial surface.

* * * * *